June 6, 1961 M. M. ARMSTRONG 2,987,647

COLOR TELEVISION RECEIVER

Original Filed April 4, 1956

INVENTOR.
Merlyn M. Armstrong
BY Mueller & Aichele
Attys.

2,987,647

COLOR TELEVISION RECEIVER

Merlyn M. Armstrong, Oak Park, Ill., assignor to Motorola, Inc., Chicago, Ill., a corporation of Illinois Continuation of application Ser. No. 576,210, Apr. 4, 1956. This application Aug. 25, 1958, Ser. No. 757,156

12 Claims. (Cl. 315—13)

Figures 1, 2:
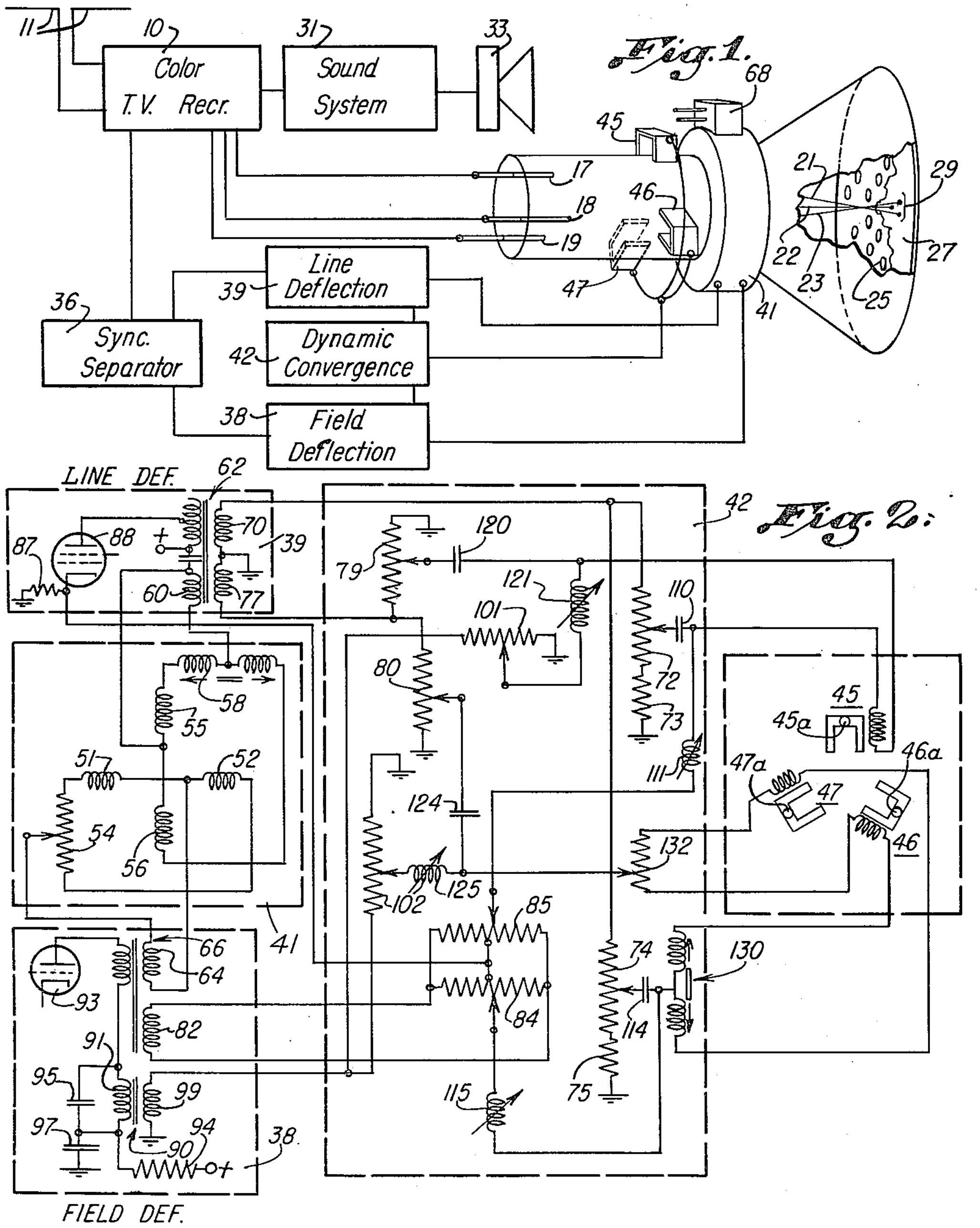

The present invention relates to color television receivers and more particularly to a system for controlling the convergence of the electron beams in a tri-beam cathode ray tube as used in such receiver. This is a continuation of my copending application Serial No. 576,210, filed April 4, 1956.

Most present day color television receivers utilize a cathode ray image reproducing tube wherein a plurality of beams are generated in spaced sources at one end of the tube and are made to scan a viewing screen at the other end of the tube to produce distinct color images thereon which appear to the human eye as an integrated color picture. One such tri-beam cathode ray tube employs a screen composed of a plurality of separate phosphor dots. The dots are arranged in triad groups with the different dots in each group emitting light of a different primary color when impinged by an electron beam. These phosphor dots are closely arranged in symmetrical groups or triads, and each group is aligned with a corresponding opening of an apertured disc known as a shadow mask, which is disposed between the groups of triads and the electron beam sources. Each beam source is associated with a particular dot in each triad and the various dots are so arranged that if each beam passes through the shadow mask at the proper angle it will strike only its associated phosphor dot. The electron beams, each modulated with color information for a particular triad, are scanned across the mask and screen so that the individual beams strike separate dots in the various triads. Each triad then comprises an element of the complete color picture and assumes a hue and brightness according to excitation thereof by the three electron beams controlled by the received signal.

It is common to space the electron beam sources equally about the axis of the cathode ray tube, and to deflect the three beams simultaneously by a common line and field deflection system in order that they scan the screen. In such a system it is necessary that the three beams be converged at the aperture of the shadow mask so that they pass through to impinge upon the proper phosphor dots in each triad and insure that any monochrome picture information which may be common to all three beams will be superimposed at the shadow mask so that the integrated monochrome picture will not exhibit fringe areas of either of the three primary colors. It is necessary that such beam convergence be maintained throughout the entire scanning cycle of the beams. However, since the electron beams are scanned through a rather wide angle and across a shadow mask all parts of which are not equidistant from the sources of the beams, the amount of convergence applied to the beams must be varied during the scanning of the beams across the screen, that is a dynamic convergence correction must be used. It has been found that signals of parabolic wave form at the field deflection frequency and signals of similar form at the line scanning frequency may be used to produce a dynamic correction which properly converges the beams in the plane of the shadow mask and maintains them so converged throughout the field and line scanning operation.

Various systems for developing such control signals have been proposed in the past and many of these, even ones of complicated and costly construction, have not given entirely suitable wave forms and have been difficult to adjust in a given receiver, thereby making alignment of the receivers in production a time consuming and costly process. Adjustment of dynamic convergence control systems has also been difficult in the past due to construction variations in the various receiver components such as deflection yokes, cathode ray tubes and the like. Furthermore, there has commonly been an undesirable inter-dependence of one convergence adjustment upon another, thus requiring considerable hit and miss technique in the adjustment.

It is an object of this invention to provide a beam convergence system for a color television receiver which develops signals of improved wave form and permits more exacting control of the beams in their various scanned positions.

Another object is to provide for a tri-beam cathode ray tube an inexpensive beam controlling system wherein various adjustments of the system may be common to two of the beams and independent of the other beam to expedite assembly and alignment of a color television receiver.

A further object of the invention is to provide a dynamic convergence control system which displays improved stability and which lends itself to assembly on a portable and detachable chassis to simplify service and adjustment of the system when the receiver is in an actual location of use.

A feature of the invention is the provision of a dynamic beam convergence system including a convergence coil coupled between a variable wave forming circuit tuned to the line frequency and a further variable wave forming circuit tuned to the second harmonic of the line frequency so that adjustments of each such circuit may be made independently of the other thus simplifying exact adjustment of the system. The precise control provided makes it possible to compensate for variations in components of the system, and the like.

Another feature is the provision of a beam control system having a convergence coil to one terminal of which is applied convergence signals at line and field frequency and to the other terminal of which is applied further convergence signals at line and field frequency. The resulting intercoupling of circuits supplying the signals of different frequencies is arranged so that a low impedance branch in each circuit furnishes a return path for signals from the other circuit to respectively isolate the signal sources and allow independent adjustment thereof.

Still another feature of the invention is the provision of such a beam control system wherein circuits coupled to each terminal of the convergence coil furnish a direct current path for a D.C. stabilizing current for the convergence coil and further circuits coupled to each terminal of the coil provide high capacity to ground so that there is an absence of critical lead length and placement in the connection between the system and its associated convergence coil.

A further feature is the provision of a convergence control system for the beams in a tri-beam cathode ray image reproducing device wherein a convergence coil for the blue beam in such a tube is coupled to sources of convergence signals energized by low impedance circuits at line and field frequencies, and coils for the green and red beams in the tube are intercoupled to one another through a balancing device and are coupled in common to sources of convergence control signals energized by low impedance circuits at line and field frequencies, thus reducing interdependence of circuit controls simplifying alignment.

Further objects, features and the attending advantages thereof will be apparent upon consideration of the following description when taken in conjunction with the accompanying drawing in which:

FIG. 1 is a block diagram showing a television receiver utilizing the present invention; and FIG. 2 is a schematic diagram of a portion of the circuit of FIG. 1.

In the preferred form the invention provides a beam convergence system for a tri-beam cathode ray tube wherein a first series tuned circuit includes a capacitor coupled to a line sweep system of the receiver and an inductor coupled to a source of convergence signals at the field frequency. A second series tuned circuit also utilizes a capacitor coupled to the line sweep system and an inductor connected to a further source of convergence control signals at the field frequency. The first tuned circuit is resonant at substantially the line frequency and develops sine waves, portions between the peaks of which approximate parabolas for dynamic convergence purposes. The second tuned circuit is resonant at substantially the second harmonic of the line frequency and provides waves which may be combined with the waves from the first circuit to more closely approximate the desired signal of parabolic wave shape. A convergence coil is coupled between the capacitor and inductor junctions of each tuned circuit. Thus signals at line frequency are applied to each terminal of the convergence coil and the amplitude and phase of these signals may be independently adjusted because of isolation provided by the convergence coil itself, which may be of much higher impedance than the inductors. The inductors of the tuned circuits also provide coupling paths to apply parabolic signals at field frequency and sawtooth (or tilt) signals at field frequency to the convergence coil. The sources of convergence signals at field frequency are also independently adjustable due to isolation provided. All of the sources of convergence signals are energized from low impedance circuits which are approximately at ground potential, to further the independence of circuit controls.

Furthermore, the sources of signals at the field frequency and the inductors of the tuned circuits form a direct current path for application of direct current to the convergence coil to stabilize convergence with line voltage variations. In a complete system for all three beams of the cathode ray tube, one circuit as outlined above is utilized for a single convergence coil associated with the blue beam and one additional such circuit is utilized in conjunction with separate single convergence coils for the red and green beams, which coils are coupled in common through an adjustable balancing component to the additional circuit.

Referring now to the drawing, FIG. 1 shows a color television receiver 10 coupled to an antenna 11. The receiver provides signals derived from a received television wave for the cathode ray image reproducing device 14 and these signals are applied to equally spaced electron beam sources 17, 18 and 19. Sources 17–19 are associated with blue, red, and green primary colors and produce electron beams 21, 22 and 23 respectively. An apertured shadow mask 25 is disposed near the screen 27 of the image reproducing device and the beams 21–23 are converged in the individual apertures of mask 25 during the scanning operation to impinge upon groups of phosphor dots or triads such as triad 29. The dots of each group produce the colors red, blue and green when impinged by the beam. As explained previously, the triads then become a colored element of a complete image. It may be appreciated that the apparatus is shown greatly out of proportion for the purpose of clearer explanation herein.

Also connected to the receiver 10 is a sound system 31 to which is applied a sound subcarrier wave which is detected and coupled to the loudspeaker 33. The receiving apparatus further includes a synchronizing signal separator circuit 36 which, together with the vertical or field deflection circuit 38 and the horizontal or line deflection circuit 39, comprise the sweep system of the receiver. Circuits 38 and 39 are coupled to the deflection yoke 41 which is disposed on the neck of the tri-beam cathode ray tube so that signals applied to this yoke by the circuits produce suitable vertical and horizontal scanning of beams 21–23 across screen 27.

It should be apparent that as the electron beams are scanned across the screen they will not always converge in an aperture of mask 25 since the mask and screen do not have sufficient curvature to coincide with the arc of the convergence point as the beams are scanned. The beam sources 17–19 may be tilted somewhat so that the beams will be converged at the center of screen 27, at least to the extent possible within manufacturing tolerances, but since convergence would not prevail at other than the center of the screen the beams would ordinarily not impinge their intended phosphor dots in all the triads. Accordingly, the point of convergence is continually varied during each line and field scanning cycle by means of a dynamic convergence system 42. System 42 is coupled to field and line deflection circuits 38 and 39 and is controlled by signals from these circuits. The output of the convergence system is applied to the dynamic convergence coils 45, 46 and 47, and these coils are mounted adjacent the paths of beams from sources 17, 18 and 19 respectively so as to develop fields which cause proper convergence of the beams.

FIG. 2 shows circuit connections of a portion of the receiving system of FIG. 1 in greater detail. Deflection yoke 41 consists of a pair of field deflection coils 51 and 52 disposed on opposite sides of the neck of tube 14 and connected together through the fixed portion of potentiometer 54. Similarly line deflection coils 55 and 56 are supported along opposite sides of the tube neck and are connected together through a variable inductor 58. Line deflection signals of sawtooth wave form, generally at 15.75 kc., are applied to coils 55 and 56 through a connection to the center tap of variable inductor 58, and at the common conection of the coils from a winding 60 on the horizontal or line output transformer 62 in circuit 39. Similarly deflection signals at the field frequency, ordinarily 60 cycles per second, are applied to the movable arm of potentiometer 54 and the common connection of coils 51 and 52 from winding 64 of the vertical or field output transformer 66. Potentiometer 54 and variable inductor 58 may be mounted in a supporting device 63 on the entire deflection yoke 41 as shown in FIG. 1. Adjustment of potentiometer 54 and inductor 58 permits variation in the signal currents in the different yoke windings and may be termed balancing provision of the yoke system. Adjustment of the balancing provision, or inductor 58, provides a variation in the line yoke field to correct for red-green horizontal line "skewness," or divergence of the horizontal traces produced by beams from the electron guns 18, 19 of FIG. 1. The balancing provision of potentiometer 54 similarly allows regulation of the field deflection field to correct for differences in the red-green vertical raster size, that is, the parallel but spaced traces developed by beams from guns 18 and 19 along the top or bottom sides of screen 27.

By means of winding 70 of transformer 62 pulses at the line frequency are applied across potentiometer 72, resistor 73 and across potentiometer 74 and resistor 75. One side of winding 70 is connected to ground, as is one side of winding 77 on transformer 62 which applies pulses at line frequency, but of opposite polarity, across potentiometers 79 and 80.

In the field deflection circuit 38, output transformer 66 includes a winding 82 which provides a signal of sawtooth wave form across potentiometers 84 and 85. Center taps of potentiometers 84 and 85 are grounded through resistor 87 which has a low value (e.g. 5.6 ohms) and is in the cathode circuit of horizontal output tube 88. Circut 38 further includes a transformer 90 the primary winding 91 of which is series coupled through the primary of output transformer 66 and to the anode of output tube 93. The other side of winding 91 is connected through resistor 94 to a positive potential source. Winding 91 is shunted by an integrating capacitor 95 and the junction of resistor 94 and winding 91 is by-passed to ground through capacitor 97. Resistor 94 and capacitor 97 provide decoupling and filtering of the field deflection signal, while winding 91 and capacitor 95 provide some further decoupling and also integration of a portion of the field signal to render this of parabolic wave form for vertical dynamic convergence purposes. The secondary winding 99 of transformer 90 has one terminal connected to ground and is coupled across the fixed portions of potentiometers 101 and 102 to apply the parabolic wave form thereacross.

Capacitor 110 and variable inductor 111 are series coupled between a variable arm of potentiometer 72 and a variable arm of potentiometer 85. Capacitor 110 and inductor 111 comprise a series tuned circuit resonant at the line deflection frequency of 15.75 kc. This tuned circuit is energized by pulses from winding 70 the amplitude of which may be varied by adjustment of potentiometer 72 and the phase of which may be adjusted by variation of inductor 111. The return path from inductor 111 is provided through resistor 87 and any small portion of potentiometer 85 between the mid point tap thereof and its variable arm. Similarly capacitor 114 and variable inductor 115 are series connected between the variable arm of potentiometer 74 and the variable arm of potentiometer 84. Elements 114 and 115 are also series resonant at the line scanning frequency and the return path for this circuit is also through a portion of potentiometer 84 and through resistor 87. Obviously the amplitude of the signal developed by this tuned circuit may be adjusted by operation of variable potentiometer 74 and the phase of the signal may be regulated by variable inductor 115.

Capacitor 120 is series connected with variable inductor 121 from the variable arm of potentiometer 79 to the variable arm of resistor 101. Elements 120 and 121 are series resonant at the second harmonic of the line frequency and are energized by signals from winding 77 which are of opposite phase to the signals from winding 70. The return path for the tuned circuit 120, 121 is provided through a portion of resistor 101. Similarly capacitor 124 is series connected with the variable inductor 125 from the variable arm of resistor 80 to the variable arm of resistor 102. Elements 124 and 125 are also series resonant at the second harmonic of the line frequency and are energized by a signal from winding 77, the return path for which is provided by a portion of resistor 102. Obviously variation of potentiometers 79 and 80 will vary the amplitudes of the signals developed by their associated circuits and adjustment of inductors 121 and 125 will vary the frequency or phase of the signals developed by these tuned circuits.

Dynamic convergence coil 45 which, as mentioned previously, is associated with the blue beam produced by electron source 17, is series connected between the junction of elements 110 and 111 and the junction of elements 120 and 121. Convergence coils 46 and 47, which are associated with the red and green electron beams, are essentially parallel coupled and have two of their terminals intercoupled through variable inductor 130 and the remaining terminals coupled through potentiometer 132. A center point of inductor 130 is connected to the junction of capacitor 114 and inductor 115 while the arm of potentiometer 132 is connected to the junction of capacitor 124 and inductor 125.

Having thus described the circuit connections of the system, a description of the operation thereof will now be given. Tuned circuit 110, 111 applies a sine wave to one end of convergence coil 45, the amplitude and phase of which is adjustable by elements 72 and 111. As understood in the prior art a portion of a sine wave between two peaks thereof approximates a parabola and may be used in effecting dynamic convergence of an electron beam in a tri-beam cathode ray tube. Reference may be made to copending application of Edward J. Hague, filed November 30, 1954, and having Serial No. 472,033, for a description of apparatus using wave forms which are approximately sinusoidal for the purpose of dynamic convergence. At the other terminal of convergence coil 45 there is applied, from resonant circuit 120 and 121, a signal at the second harmonic of the line frequency. As has been explained in the copending application of Kurt Schlesinger, filed September 30, 1953, and having Serial No. 379,998, combination of the second harmonic with the fundamental sine wave can be made to produce a resultant wave form which closely approximates that of the desired parabola. Through adjustment of potentiometer 79 and inductor 121 the resultant signal developed in coil 45 is to a measurable degree the optimum wave form.

Signals of parabolic wave form at the field deflection frequency will also be applied to one terminal of convergence coil 45 through the variable arm of potentiometer 101 and through variable inductor 121. Furthermore, signals of sawtooth wave form at the field frequency are applied to the other terminal of coil 45 from the variable arm of potentiometer 85 and through inductor 111. These sawtooth signals are used for "tilt" of the parabolic signals and serve to create desirable distortion thereof for optimum convergence in a given situation. It may be seen that coils 111 and 121 will be of comparatively low impedance at the field frequency so that these coils have minimal effect on the field or vertical convergence signals. It should also be pointed out that amplitude of the parabolic signal may be varied by adjustment of potentiometer 101 and that the polarity and the amplitude of the tilt signal may be adjusted by operation of variable resistor 85 on either side of its center tap which is essentially grounded at the field frequency by resistor 87. Intercoupling of the field convergence signals into the line sweep system is negligible since capacitors 110 and 120 both provide relatively high impedance for signals at the field frequency. On the other hand, convergence signals at line frequency do no appreciably effect the field deflection system since there is a comparatively low impedance path for these signals between the arm of potentiometer 85 and ground and since the network of winding 99 and potentiometer 101 has comparatively low impedance to ground. The step down action of transformer 90 permits use of a relatively low integrating capacitance with a low voltage rating across the primary winding 91, while at the same time reducing the vertical parabolic signal source to one which is grounded and at the required low impedance for optimum performance. This latter is a definite advantage. In may pervious circuits the integration was sensitive to, and dependent upon, the resistive load impedance of the combination of vertical amplitude controls and vertical convergence coils, i.e., those placed around the tube neck. Consequently, in many cases the component variations resulted in different amplitude control settings and therefore, different resistive load impedances which were not optimum. Thus, the correct wave form was not realizable simultaneously with correct amplitude settings. The use of a transformer gives great latitude for impedance matching, and thus elimination of the interdependence of the circuit controls.

While the convergence signal sources for the blue beam convergence coil 45 are constructed as a separate unit, it has been found possible to provide combined convergence signal sources for the red and green convergence coils 46 and 47. Accordingly, convergence signals at line frequency are applied to coils 46 and 47 from tuned circuit 114 and 115 through an adjustable balancing inductor 130 which permits adjustment of the relative amplitudes of signals applied to the different convergence coils. It should also be pointed out that inductor 130 may be unnecessary in many cases and merely a direct connection of the coils may suffice. Similarly a signal at the second harmonic of the line frequency is applied to the other terminal of the coils 46 and 47 from the tuned circuit 124 and 125 and through portions of potentiometer 132, which is of low impedance at line frequency compared to that of the coils and is insignificant. It should also be apparent that a parabolic signal at the field frequency is applied from the arm of potentiometer 102 through inductor 125 to the coils 46 and 47 and that adjustment of potentiometer 132 would permit variation in the amounts of signals so applied since the impedance of potentiometer 132 is significant compared to that of coils 46 and 47 at field frequency. Furthermore, a tilt signal at the field frequency is applied from the arm of potentiometer 84 to the mid point of variable inductor 130, which has a low impedance at the field frequency, thus effectively directly applying the correction signals to the other terminals of coils 46 and 47. The exact operation of the circuit associated with coils 46 and 47 and the function of the various components associated therewith is believed obvious after considering the operation of the system supplying signals to coil 45. The essential difference in adjustment of the system for the red and green convergence coils is in the balancing of the line convergence signals between the coils by means of inductor 130 (if it is used) and in balancing of the convergence signals at field frequency by means of the variable potentiometer 132.

The dynamic convergence system just described is utilized to produce convergence of the electron beams at all portions of the screen. However, in order to insure that convergence is obtained at the center of the screen it is common to provide static convergence by means of adjustable permanent magnets *45a*, *46a*, and *47a* respectively associated with the convergence coils. Thus in the alignment of the color television receiver it is usual to first adjust these permanent magnets with the dynamic convergence system inoperative to establish convergence at the screen center. After this static convergence has been effected, the dynamic convergence system may be adjusted as previously described to obtain convergence when the beams are deflected to impinge other locations of the screen.

It should be appreciated that the effect of the dynamic convergence system may be changed while the effect of the static system remains unchanged since the dynamic system relies on the use of electro-magnets and variation of the line voltage supplying power to the entire receiving system may influence these, while the static system relies on the use of steady permanent magnets. Furthermore, if the static system is adjusted when the dynamic system is not operating, the amount of static convergence necessary may be changed when the dynamic system is later energized. This can be understood by considering that signals of parabolic wave form are applied to the convergence coil and that these signals will have a direct current component. This direct current component will of course influence the setting of the permanet magnets required for static convergence. Accordingly, the convergence system further includes a provision to offset the change in average value of the dynamic correcting signals with changes in line voltage and/or change in static convergence necessitated by addition of the dynamic convergence system.

The connection of the center taps of potentiometers 84, 85 to cathode resistor 87 provides a D.C. current flow through the convergence coils in order to furnish direct current for each convergence coil which is of a proper amount to offset the change in the average or D.C. component of the dynamic signals applied to the convergence coils when line voltage varies. It may be seen that one current path, that for blue coil, is through a portion of potentiometer 85, inductor 111, coil 45, inductor 121 and a portion of potentiometer 101. In the other case, that for the red and green coils, the current path is through a portion of potentiometer 84, inductor 115, portions of inductor 130, coils 46 and 47, portions of potentiometer 132, inductor 125 and a portion of potentiometer 102. Since this direct current for tube 83 is also supplied by the usual power supply of the entire receiving system, the amount thereof will vary with line voltage variation and will thus follow changes in the dynamic convergence caused by line voltage variation. It has been found that a very low value of resistance for resistor 87 will provide proper results without seriously affecting horizontal size and that it is unnecessary to bypass this resistor.

The beam convergence system further lends itself to construction on a separate and removable chassis within the housing of the entire television receiver. It may be noted that the system can be fed by several leads from the line and field deflection systems and that six leads from the convergence system 42 run to the convergence coils 45–47. Accordingly, in a practical situation one who is undertaking to adjust the convergence system may remove a portable chassis on which system 42 is mounted, insert extensions in the leads (or alternatively the leads could be originally made of the required length), and the chassis may be positioned in front of the receiver where the effect of each adjustment made can be easily observed. It should be noted that the placement and length of leads between the convergence coils and the source of convergence signals will not be critical in the circuit as described. This may be appreciated by considering the fact that each of the leads coupling the convergence system to the convergence coils includes a series capacitor (capacitors 110, 114, 120, 124) which is connected to ground through a relatively small resistance at the frequency encountered. Therefore, further alteration of shunt capacity introduced by changing positions of the leads will not cause an appreciable change in the total capacity existing between the leads and ground. Thus the entire system is highly practical for servicing in the field.

There is also a very desirable independence of the various controls of this system thus further making it easy to adjust. With the line convergence signal applied to one end of the convergence coil and the line second harmonic signal, or modifying signal, applied to the other end of convergence coil, the sources are isolated from one another and adjustment of one has but minimal effect on the other. This isolation is increased by making the impedance of the blue convergence coil, or that of the set of red and green coils, ten or more times that of the inductors in the tuned circuits. Furthermore, desirable independence prevails in the case of the field deflection signals wherein the parabolic signal is applied to one end of the convergence coil and the tilt, or correction signal, is applied to the other end thereof. Accordingly, with the interaction among the various controls reduced, and the use of a common signal source for the red and green coils, 46 and 47, alignment is greatly simplified and it is unnecessary to go through extensive cut and try procedures as have been required with some convergence systems of the past.

This system which provides the desired convergence wave form includes no tubes and is extremely simple and inexpensive to align because the necessary independent controls and certain intentionally common controls are provided. As previously pointed out, the entire system may also be constructed on a chassis which can be conveniently positioned while the adjustments are made. Thus it may be appreciated that the convergence system can be regulated precisely through its various control provisions so as to provide optimum convergence despite somewhat liberal manufacturing tolerances in cathode ray tube and yoke combinations.

I claim:

1. In a television receiver including a cathode ray image reproducing tube having means for developing a plurality of cathode ray beams and scanning means including a line sweep system for deflecting the beams at a selected line frequency and a field sweep system for deflecting the beams at a selected field frequency, a control circuit for dynamically controlling the convergence of the cathode ray beams including in combination, convergence electrode means adapted to be disposed adjacent the cathode ray tube to develop a field for converging a beam, a first circuit connected to the line and field sweep systems and including first means providing convergence control signals at the field frequency and means for developing convergence control signals at the line frequency, a second circuit connected to the line and field sweep systems and including second means providing further convergence control signals at the field frequency and means for developing convergence control signals at substantially the second harmonic of the line frequency, and means coupling said convergence electrode means to said first and second circuits to apply convergence control signals thereto from said first and second circuits.

2. In a television receiver including a cathode ray image reproducing tube having means for developing a plurality of cathode ray beams and scanning means including a line sweep system for deflecting the beams at a selected line frequency and a field sweep system for deflecting the beams at a selected field frequency, a control circuit for dynamically controlling the convergence of the cathode ray beams including in combination, convergence coil means adapted to be disposed adjacent the cathode ray tube to develop a field for converging a beam, a first circuit connected to and energized by the line and field sweep systems and including first means for developing convergence control signals at field frequency series coupled with an adjustable resonant circuit for developing convergence control signals at the line frequency, a second circuit connected to and energized by the line and field sweep systems and including second means for developing further convergence control signals at field frequency series connected with an adjustable resonant circuit for developing convergence control signals at substantially the second harmonic of the line frequency, and means coupling said convergence coil means to said first and second circuits to apply convergence control signals thereto from said first and second circuits.

3. In a television receiver including a cathode ray image reproducing tube having means for developing a plurality of cathode ray beams and scanning means including a line sweep system for deflecting the beams at a selected line frequency, a control circuit for dynamically controlling the convergence of the cathode ray beams including in combination, convergence coil means disposed adjacent the cathode ray tube to develop a field for converging a beam, a first series tuned circuit connected to the line sweep system for developing convergence control signals at the line frequency, a second series tuned circuit connected to the line sweep system for developing convergence control signals at substantially the second harmonic of the line frequency, and means coupling said convergence coil means between said first and second circuits to apply convergence control signals thereto from said first and second circuits.

4. In a television receiver including a cathode ray image reproducing tube having means for developing three cathode ray beams and scanning means including a line sweep system for deflecting the beams at a selected line frequency, a control circuit for dynamically controlling the convergence of the cathode ray beams including in combination, first, second and third convergence coil means each adapted to be disposed adjacent the cathode ray tube to develop respective fields for converging the beams, first and second series tuned circuits each connected to the line sweep system for developing convergence control signals at the line frequency, third and fourth series tuned circuits each connected to the line sweep system for developing convergence control signals at substantially the second harmonic of the line frequency, means coupling said first convergence coil means to said first and third tuned circuits to apply convergence control signals thereto, and means intercoupling said second and third convergence coil means and connecting the same to said second and fourth tuned circuits to apply convergence control signals thereto.

5. In a television receiver including a cathode ray image reproducing tube having means for developing a plurality of cathode ray beams and scanning means including a line sweep system for deflecting the beams at a selected line frequency and a field sweep system for deflecting the beams at a selected field frequency, the control circuit for dynamically controlling the convergence of the cathode ray beams including in combination, a first source of convergence control signals at the field frequency, a first series resonant network including first inductor means coupled to said first source of convergence control signals and first capacitor means coupled to the line sweep system so that said first series resonant network forms signals of substantially sinusoidal form at the line frequency, a second source of convergence control signals at the field frequency, a second series resonant network having second inductor means coupled to said second source of convergence control signals and second capacitor means coupled to the line sweep system so that said second series resonant network forms signals of substantially sinusoidal form at the second harmonic of the line frequency, said first and second sources each comprising a return path for signals of line frequency and said first and second inductor means providing a path for signals of field frequency, and convergence coil means adapted to be disposed adjacent the cathode ray tube, said coil means being coupled to said first capacitor means and said first inductor means and to said second capacitor means and said second inductor means, so that said first and second sources supply convergence control signals to said convergence coil means through said first and second inductor means and said signals of substantially sinusoidal form are applied to said convergence coil means by said first and second resonant networks.

6. In a television receiver including a cathode ray image reproducing tube having means for developing three cathode ray beams and scanning means including a line sweep system for deflecting the beams at a selected line frequency, and a field sweep system for deflecting the beams at a selected field frequency, a control circuit for dynamically controlling the convergence of the cathode ray beams including in combination, first, second and third convergence coil means each disposed adjacent the cathode ray tube to develop respective fields for converging the beams, first, second, third and fourth circuit means coupled to the field sweep system for developing convergence control signals at the field frequency, first and second series tuned circuits coupled respectively to said first and second circuit means and to the line sweep system for developing convergence control signals at the line frequency, third and fourth series tuned circuits coupled respectively to said third and fourth circuit means and to the line sweep system for developing convergence control signals at substantially the second harmonic of the line frequency, means coupling said first convergence coil means between said first and third tuned circuits to apply thereto convergance control signals at line and field frequencies, variable impedance means coupling said second and third convergence coil means in parallel and means coupling said parallel connected second and third convergence coil means between said second and fourth tuned circuits to apply thereto convergence control signals at line and field frequency with said variable impedance means providing a signal balancer between said second and third convergence coil means.

7. In a television receiver including a cathode ray image reproducing tube having means for developing three cathode ray beams and scanning means including a line sweep system for deflecting the beams at a selected line frequency, and a field sweep system for deflecting the beams at a selected field frequency, a control circuit for dynamically controlling the convergence of the cathode ray beams including in combination, first, second and third inductor means each adapted to be disposed adjacent the cathode ray tube to deveolp respective fields for converging the beams, first and second circuits each coupled to the line sweep system for developing convergence control signals at the line frequency, third and fourth circuits each coupled to the field sweep system for developing convergence signals at the field frequency, means coupling said first inductor means between said first and third circuits to apply convergence control signals thereto, and variable means coupling said second and third inductor means together and between said second and fourth circuits to apply convergence control signals thereto.

8. In a television receiver which includes a housing having therein a cathode ray image reproducing tube with means for developing a plurality of cathode ray beam components, and scanning means including a line sweep system for deflecting the beam components at a selected line frequency and a field sweep system for deflecting the beam components at a selected field frequency, the combination including, field producing means adapted to be disposed adjacent the cathode ray tube for converging the beam components, a control circuit for developing convergence control signals, said control circuit being constructed as a unit separate and removable from the television receiver housing, a first plurality of conductors for applying the convergence control signals from said control circuit to said field producing means, and a second plurality of conductors connected to the line sweep system and to the field sweep system for energizing said control circuit, said control circuit including a plurality of variable means for regulating the wave form of convergence control signals developed therein.

9. In a television receiver unit including a cathode ray image reproducing tube having means for developing a plurality of cathode ray beam components, and scanning means including a line sweep system for deflecting the beam components at a selected line frequency and a field sweep system for deflecting the beam components at a selected field frequency, including in combination, field producing means adapted to be disposed adjacent the cathode ray tube for converging the beam components, a control circuit for developing convergence control signals, said control circuits being constructed on a chassis separate and removable from the television receiver unit, a first plurality of conductors for applying the convergence control signals from said control circuit to said field producing means, and a second plurality of conductors connected to the line sweep system and to the field sweep system for energizing said control circuit, said control circuit including variable reactance means and a plurality of variable resistors for regulating the wave form of convergence control signals developed therein, and said first and second plurality of conductors being of respective lengths to permit positioning of said control circuit so that the screen of the cathode ray image reproducing tube may be viewed as said variable reactance means and said variable resistors are manually regulated.

10. In a television receiver which includes a housing having therein a cathode ray image reproducing tube with means for developing a plurality of cathode ray beam components, and scanning means including a line sweep system for deflecting the beam components at a selected line frequency and a field sweep system for deflecting the beam components at a selected field frequency, the combination including, field producing means adapted to be disposed adjacent the cathode ray tube for converging the beam components, a control circuit for developing convergence control signals, said control circuit being constructed as a unit separate and removable from the television receiver housing, a first plurality of conductors for applying the convergence control signals from said control circuit to said field producing means, a second plurality of conductors connected to the line sweep system and to the field sweep system for energizing said control circuit by respective line and field signals developed with respect to a reference point, said control circuit including means providing low impedance to the reference point at line frequency for at least one of said first plurality of conductors and low impedance to the reference point at field frequency for another of said first plurality of conductors, and said control circuit further including a plurality of variable means for regulating the wave form of convergence control signals developed therein.

11. In a television receiver having a cathode ray image reproducing tube having means for developing a cathode ray beam component, a line sweep system for deflecting the beam component and a field sweep system for further deflecting the beam component: a control system for the cathode ray beam components, including in combination, first and second field producing means adapted to be disposed adjacent the cathode ray tube to develop respective fields for influencing two beam components, first circuit means including a capacitor and tunable inductor connected to the line sweep system to develop first control signals at the line frequency, second circuit means connected to the field sweep system to develop second control signals at the field frequency, energizing means for energizing one of said sweep systems with an operating direct current potential, a variable balancing inductor interconnecting said first and second field producing means and connecting the same to said first circuit means and means coupling said first and second field producing means to said energizing means and said second circuit means thereby to energize the same with the first and second control signals and a direct current dependent upon the energization of said one of said sweep systems.

12. In a television receiver including a cathode ray image reproducing tube having means for developing a plurality of cathode ray beams and scanning means including a line sweep system for deflecting the beams at a selected line frequency and a field sweep system for deflecting the beams at a selected field frequency, a control circuit for dynamically controlling the convergence of the cathode ray beams including, in combination, a plurality of single winding inductors disposed adjacent the cathode ray tube to develop respective fields for converging the cathode ray beams, a first adjustable circuit connected to and energized by the line and field sweep systems and including first means for developing convergence control signals at field frequency and second means for developing convergence control signals at the line frequency, a second adjustable circuit connected to and energized by the field sweep system and including third means for developing convergence control signals at field frequency, and connecting means coupling said inductors in parallel between said first and second circuits to apply convergence control signals thereto.

No references cited.